United States Patent
Li (10) Patent No.: US 11,301,284 B2
(45) Date of Patent: Apr. 12, 2022

(54) METHOD FOR MANAGING VNF INSTANTIATION AND DEVICE

(71) Applicant: Huawei Technologies Co., Ltd., Shenzhen (CN)

(72) Inventor: Shitao Li, Nanjing (CN)

(73) Assignee: HUAWEI TECHNOLGOIES CO., LTD., Shenzhen (CN)

( * ) Notice: Subject to any disclaimer, the term of this patent is extended or adjusted under 35 U.S.C. 154(b) by 282 days.

(21) Appl. No.: 16/725,579

(22) Filed: Dec. 23, 2019

(65) Prior Publication Data

US 2020/0133708 A1  Apr. 30, 2020

Related U.S. Application Data

(63) Continuation of application No. PCT/CN2018/085750, filed on May 5, 2018.

(30) Foreign Application Priority Data

Jun. 29, 2017  (CN) .......................... 201710516763.5

(51) Int. Cl.
 *G06F 9/455* (2018.01)
 *G06F 9/50* (2006.01)
 (Continued)

(52) U.S. Cl.
 CPC ........ *G06F 9/45558* (2013.01); *G06F 9/5077* (2013.01); *H04L 41/0806* (2013.01);
 (Continued)

(58) Field of Classification Search
 None
 See application file for complete search history.

(56) References Cited

U.S. PATENT DOCUMENTS

2017/0006083 A1  1/2017  McDonnell
2017/0063714 A1  3/2017  Xiang
(Continued)

FOREIGN PATENT DOCUMENTS

CN  104219127 A  12/2014
CN  104954220 A  9/2015
(Continued)

OTHER PUBLICATIONS

Herrera, J., et al., "Resource Allocation in NFV: A Comprehensive Survey," EEE Transactions on Network and Service Management 13(3):1-1, Sep. 2016, 15 pages.

*Primary Examiner* — Quang N Nguyen
(74) *Attorney, Agent, or Firm* — Conley Rose, P.C.

(57) ABSTRACT

A method for managing virtualized network function (VNF) instantiation, including a first device receiving, from a requester device, a request for instantiating the NS, wherein the request carries instance information of a VNF that is in a network service (NS) and to be instantiated using a second device. After receiving the request, the first device records an instance identifier (ID) of the VNF. In a VNF instantiation phase, the first device authorizes instantiation of the VNF based on the instance ID of the VNF that is recorded during instantiation of the NS. The instance ID of the VNF to be instantiated by the second device is carried in the request, such that the first device can obtain a relationship between the VNF to be instantiated by the second device and the NS, and therefore can control instantiation of the VNF based on the relationship.

16 Claims, 5 Drawing Sheets

(51) Int. Cl.
*H04L 41/0806* (2022.01)
*H04L 41/0893* (2022.01)
*H04L 41/0896* (2022.01)
*H04L 41/5041* (2022.01)
*H04L 67/10* (2022.01)

(52) U.S. Cl.
CPC ...... *H04L 41/0893* (2013.01); *H04L 41/0896* (2013.01); *H04L 41/5041* (2013.01); *H04L 67/10* (2013.01); *G06F 2009/45595* (2013.01)

(56) References Cited

U.S. PATENT DOCUMENTS

| | | | |
|---|---|---|---|
| 2017/0150399 A1 | 5/2017 | Kedalagudde et al. | |
| 2017/0315844 A1 | 11/2017 | Ji et al. | |
| 2018/0024852 A1 | 1/2018 | Yabushita et al. | |
| 2018/0062946 A1* | 3/2018 | Zhu | H04L 41/0806 |
| 2018/0191581 A1* | 7/2018 | Yu | H04L 41/5041 |
| 2018/0205637 A1* | 7/2018 | Li | H04L 41/5058 |
| 2018/0367372 A1* | 12/2018 | Chou | H04L 41/0681 |
| 2019/0036783 A1* | 1/2019 | Xu | H04L 41/0233 |
| 2019/0089588 A1* | 3/2019 | Xu | H04L 67/1012 |
| 2019/0140921 A1* | 5/2019 | Xu | G06F 9/45558 |
| 2019/0327621 A1* | 10/2019 | Chou | H04W 24/02 |
| 2020/0044919 A1* | 2/2020 | Yao | H04L 41/0806 |

FOREIGN PATENT DOCUMENTS

| | | |
|---|---|---|
| CN | 105429780 A | 3/2016 |
| CN | 105634782 A | 6/2016 |
| CN | 105871570 A | 8/2016 |
| CN | 106031116 A | 10/2016 |
| CN | 106161171 A | 11/2016 |
| CN | 106302068 A | 1/2017 |
| CN | 106533714 A | 3/2017 |
| WO | 2016048430 A1 | 3/2016 |
| WO | 2016121802 A1 | 8/2016 |

* cited by examiner

METHOD FOR MANAGING VNF INSTANTIATION AND DEVICE

CROSS-REFERENCE TO RELATED APPLICATIONS

This application is a continuation of International Patent Application No. PCT/CN2018/085750, filed on May 5, 2018, which claims priority to Chinese Patent Application No. 201710516763.5, filed on Jun. 29, 2017. The disclosures of the aforementioned applications are hereby incorporated by reference in their entireties.

TECHNICAL FIELD

The present disclosure relates to the field of cloud computing technologies, and in particular, to a method for managing VNF instantiation and a device.

BACKGROUND

Network function virtualization (NFV) means that a function of a dedicated device in a conventional network is carried using a general-purpose hardware device and a virtualization technology, to reduce high costs of dedicated device deployment. Software is not bound to dedicated hardware, such that a device function no longer depends on the dedicated hardware. Compared with the conventional network, the NFV brings in a virtualization layer, and lifecycle management of a virtualized network function (VNF) and a virtualized network service (NS) is implemented through network management and orchestration. In an NFV architecture, the VNF is a lower-layer network function, and the NS is an upper-layer network service implemented using one or more VNFs, for example, a network service of an Internet Protocol (IP) multimedia subsystem (IMS) or a network service of an evolved packet core (EPC). In other words, one NS may include one or more VNFs.

When a service requester needs to implement an NS, the service requester may send a descriptor of the NS (e.g., a Network Service descriptor (NSD)), also referred to as an NS deployment template, to a resource management entity. The resource management entity may be a network function virtualization orchestrator (NFVO). The NSD mainly describes a topology structure of the NS and indicates a descriptor of each included VNF (e.g., a VNF descriptor (VNFD)). In information about the topology structure, a connection between VNFs is described using a virtualized link descriptor (VLD). A VNFD is a descriptor of a VNF, and is also referred to as a deployment template of the VNF. The VNFD describes composition of each VNF, for example, running software and information about a required virtual resource. The virtual resource includes a central processing unit (CPU) resource, a storage resource, or the like. The service requester may request the resource management entity to instantiate the NS based on the NSD. Instantiation of the NS means creating an instance of the NS. In an NS instantiation process, the resource management entity may initiate, based on the VNFD indicated in the NSD, instantiation of a required VNF, or may use an existing instance of the VNF. Instantiation of the VNF means creating an instance of the VNF.

Currently, there are two manners of instantiating a VNF. In one manner, as described above, the resource management entity initiates, in the NS instantiation process, instantiation of the VNF in the NS. In the other manner, an equipment management (EM) initiates instantiation of the VNF.

In the solution of instantiating the VNF using the EM, the EM does not have related information of the NS and cannot associate the VNF with the NS during instantiation of the VNF. Consequently, the VNF instantiated by the EM cannot provide a service externally. The VNF is merely a virtualized network function constituting the NS, and only the NS can provide a specific network service. Therefore, the VNF independent of the NS cannot independently provide a service externally. If the EM instantiates a large quantity of VNFs independent of the NS, a waste of resources is inevitably caused. Therefore, instantiation of the VNF by the EM needs to be controlled.

SUMMARY

Embodiments of the present disclosure provide a method for managing VNF instantiation and a device, to avoid a waste of resources.

To achieve the foregoing objective, the following technical solutions are used in the present disclosure.

According to an aspect, an embodiment of the present disclosure provides a method for managing VNF instantiation. The method includes two phases: NS instantiation and VNF instantiation. In the NS instantiation phase, a requester device carries instance information of a virtualized network function VNF that is in the NS and that is to be instantiated using a second device, in a request that is for instantiating the NS and that is sent to a first device. The instance information includes an instance identifier of the VNF and status information indicating that the VNF is to be instantiated by the second device. After receiving the request for instantiating the NS, the first device determines, based on the status information, the VNF that is in the NS and that is to be instantiated by the second device, and records the instance identifier of the VNF that is to be instantiated using the second device. In the VNF instantiation phase, the first device authorizes instantiation of the VNF based on the instance identifier that is of the VNF and that is recorded during instantiation of the NS.

The instance ID of the VNF to be instantiated by the second device is carried in the request that is for instantiating the NS and that is sent to the first device, such that the first device can obtain a relationship between the VNF to be instantiated by the second device and the NS, and therefore can control instantiation of the VNF based on the relationship. For example, instantiation of the VNF is allowed when there is a relationship between the VNF and the NS. This ensures that the second device instantiates a valid VNF, and avoids a waste of resources.

In a possible design, before sending the request for instantiating the NS, the requester device obtains, from a virtualized network function manager VNFM using the second device, the instance identifier of the VNF that is in the NS and that is to be instantiated using the second device.

In this embodiment of the present disclosure, the instance ID of the VNF to be instantiated by the second device is created before the request for instantiating the NS is sent, such that the requester device can carry the instance ID of the VNF to be instantiated by the second device in the request for instantiating the NS and send the request to the first device, to enable the first device to obtain a relationship between the NS to be instantiated and the VNF to be instantiated by the second device.

In a possible design, that the first device authorizes the instantiation of the VNF based on the instance identifier that is of the VNF and that is recorded during instantiation of the NS includes: the VNFM sends a grant request to the first device after the VNFM receives a request sent by the second device for instantiating the VNF. The grant request is used to request the first device to authorize the VNFM to perform an operation of instantiating the VNF, and the grant request carries the instance identifier of the VNF. After receiving the grant request, the first device determines whether a condition for instantiating the VNF is met. The condition includes that the instance identifier that is of the VNF and that is carried in the grant request exists in the instance identifier that is of the VNF and that is recorded during the instantiation of the NS. After determining that the condition for instantiating the VNF is met, the first device authorizes the VNFM to perform the operation of instantiating the VNF. Instantiation of the VNF is allowed when there is a relationship between the VNF and the NS. Therefore, the second device cannot instantiate an invalid VNF, thereby avoiding a waste of resources.

In a possible design, after determining that the condition for instantiating the VNF is met, the first device further sends, to the VNFM, a subscription request for subscribing to an instance of the VNF. The subscription request is used to request the VNFM to send a notification message to the first device after the VNFM instantiates the VNF. The first device receives the notification message from the VNFM after the VNF is successfully instantiated, where the notification message is used to indicate that the VNF is already instantiated. Through a subscription mechanism, in an NS instantiation process, in addition that the first device itself instantiates a VNF itself, the first device may further wait for another device to instantiate a VNF in the NS, thereby making the NS instantiation process more flexible.

According to another aspect, an embodiment of the present disclosure provides a method for managing VNF instantiation. The method includes: A requester device sends, to a first device, a request for instantiating a network service NS. The requester device carries, in the request, an instance identifier of a VNF that is in the NS and that is to be instantiated using a second device and status information indicating that the VNF is to be instantiated by the second device. The instance identifier of the VNF, the status information of which is to be instantiated by the second device, is to be recorded by the first device. The requester device receives a response for instantiation of the NS returned by the first device. After receiving returned by the first device, the requester device requests, using the second device, a VNFM to instantiate the VNF. During instantiation of the VNF, the instance identifier that is of the VNF and that is recorded by the first device is used to determine a grant for authorization of the instantiation of the VNF.

The requester device carries the instance ID of the VNF to be instantiated by the second device in the request that is for instantiating the NS and that is sent to the first device, such that the first device can obtain a relationship between the VNF to be instantiated by the second device and the NS, and therefore can control instantiation of the VNF based on the relationship. For example, the instantiation of the VNF is allowed when there is a relationship between the VNF and the NS. This ensures that the second device instantiates a valid VNF, and avoids a waste of resources.

In a possible design, before requesting for instantiating the NS, the requester device requests, using the second device, the VNFM to create the instance identifier of the VNF that is in the NS and that is to be instantiated using the second device, and receives the instance identifier of the VNF that is created by the VNFM.

In this embodiment of the present disclosure, the instance ID of the VNF to be instantiated by the second device is created before the request for instantiating the NS is sent, such that the requester device can carry the instance ID of the VNF to be instantiated by the second device in the request for instantiating the NS and send the request to the first device, to enable the first device to obtain a relationship between the NS to be instantiated and the VNF to be instantiated by the second device.

In a possible design, the requester device queries for a descriptor of a VNF, indicated in a deployment template of the NS, to determine the VNF that is to be instantiated by the second device. The descriptor of the VNF includes an indication parameter. The indication parameter is used to indicate whether the VNF is to be instantiated using the second device. The requester device determines, based on the indication parameter, the VNF that is to be instantiated by the second device; and performs, based on a determining result through the second device, the operation of requesting the VNFM to create the instance identifier of the VNF that is in the NS and that is to be instantiated using the second device.

According to another aspect, an embodiment of the present disclosure provides an apparatus for managing VNF instantiation. The apparatus has a function of implementing behavior of the first device in the foregoing method embodiments. The function may be implemented by hardware, or may be implemented by hardware by executing corresponding software. The hardware or software includes one or more components (for example, a receiving unit configured to interact with a requester device, a processing unit configured to implement NS instantiation, and a management unit configured to perform authorization control during instantiation of a VNF) corresponding to the foregoing function.

According to another aspect, an embodiment of the present disclosure provides an apparatus for managing VNF instantiation. The apparatus has a function of implementing behavior of the requester device in the foregoing method embodiments. The function may be implemented by hardware, or may be implemented by hardware by executing corresponding software. The hardware or software includes one or more components (for example, a transceiver unit configured to interact with a first device, a processing unit configured to interact with a second device, and a policy unit configured to determine a VNF that is in an NS and that is to be instantiated using the second device) corresponding to the foregoing function.

According to another aspect, an embodiment of the present disclosure provides a first device, which may be implemented based on a computer structure. The first device includes a memory and a processor. The memory is configured to store a program instruction for implementing the function of the first device in the foregoing method embodiments. The processor is configured to execute the program instruction in the memory, to implement the function of the first device in the foregoing method embodiments.

According to another aspect, an embodiment of the present disclosure provides a requester device, which may be implemented based on a computer structure. The requester device includes a memory and a processor. The memory is configured to store a program instruction for implementing the function of the requester device in the foregoing method embodiments. The processor is configured to execute the program instruction in the memory, to implement the function of the requester device in the foregoing method embodiments.

According to still another aspect, an embodiment of the present disclosure provides a computer storage medium, configured to store a computer software instruction used by the foregoing first device. The computer storage medium includes a program designed for executing the foregoing aspects for the first device.

According to still another aspect, an embodiment of the present disclosure provides a computer storage medium, configured to store a computer software instruction used by the foregoing requester device. The computer storage medium includes a program designed for executing the foregoing aspects for the requester device.

In the embodiments of the present disclosure, the instance ID of the VNF to be instantiated by the second device is carried in the request that is for instantiating the NS and that is sent to the first device, such that the first device can obtain a relationship between the VNF to be instantiated by the second device and the NS, and therefore can control instantiation of the VNF based on the relationship, thereby ensuring that the second device instantiates a valid VNF and avoiding a waste of resources.

DESCRIPTION OF EMBODIMENTS

To make the objectives, technical solutions, and advantages of the present disclosure clearer, the following further describes the present disclosure in detail with reference to the accompanying drawings.

Figure 1:
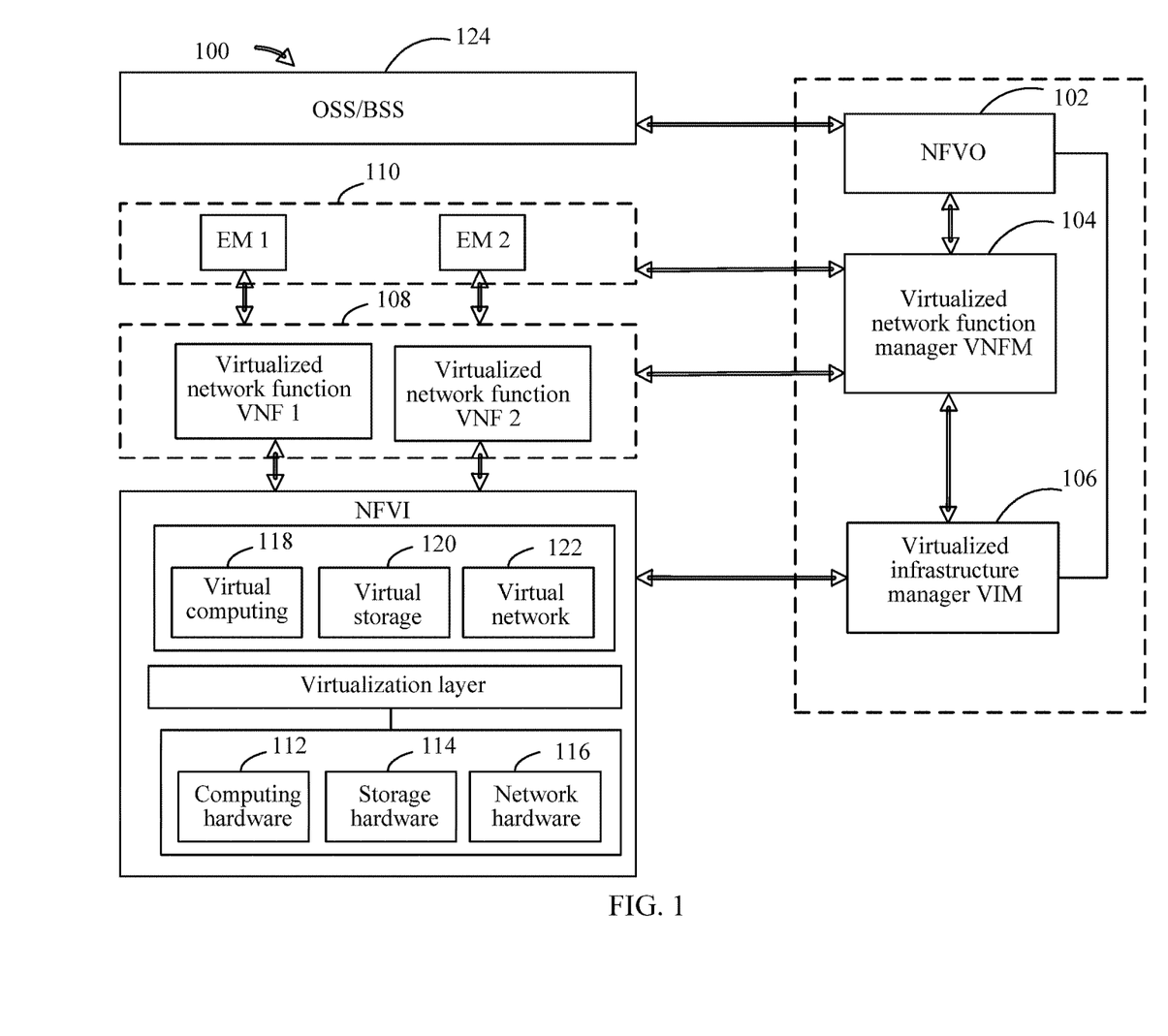
FIG. 1 is a diagram of an architecture of an NFV system according to an embodiment of the present disclosure.

This application may be applied to an architecture of an NFV system. FIG. 1 is a schematic diagram of an architecture of an embodiment of an NFV system 100. The NFV system 100 includes the following function components.

A network function virtualization orchestrator (NFVO) 102 is mainly responsible for management of an NS lifecycle, allocation and scheduling of a virtual resource in a virtualization infrastructure (NFVI), and the like. The NFVO 102 may communicate with one or more virtualized network function managers (VNFM) 104, perform an operation related to lifecycle management such as VNF instantiation, send configuration information to the VNFM 104, and request the VNFM 104 to collect status information of a VNF 108. In addition, the NFVO 102 may also communicate with a virtualized infrastructure manager (VIM) 106, perform resource allocation and/or reservation, and exchange virtualized hardware resource configurations and status information with the VIM 106.

The virtualized network function manager (VNFM) 104 is responsible for lifecycle management of one or more VNFs, for example, instantiating, updating, querying for, scaling, or terminating the VNF 108. The VNFM 104 may communicate with the VNF 108 to complete VNF lifecycle management and exchanging configurations and status information with the VNF 108. In the NFV architecture, there may be a plurality of VNFMs, responsible for performing lifecycle management of different types of VNFs.

The virtualized infrastructure manager (VIM) 106 controls and manages interactions between the VNF 108 and computing hardware 112, storage hardware 114, network hardware 116, virtual computing 118, a virtual storage 120, and a virtual network 122. For example, the VIM 106 performs a resource management function, including management of an infrastructure resource, allocation (for example, adding a resource to a virtual container), and running a function (for example, collecting NFVI fault information). The VNFM 104 and the VIM 106 may communicate with each other, request resource allocation, and exchange virtualized hardware resource configurations and status information.

The network function virtualization infrastructure (NFVI) is an infrastructure layer of an NFV, and includes a hardware component, a software component, or a combination thereof, to establish a virtualized environment, and deploy, manage, and implement the VNF 108. A hardware resource and a virtualization layer are used to provide virtualized resources, such as a virtual machine and a virtual container in another form, for the VNF 108. The hardware resource includes the computing hardware 112, the storage hardware 114, and the network hardware 116. In an implementation, resources of the computing hardware 112 and the storage hardware 114 may be centralized. The virtualization layer in the NFVI may abstract the hardware resource, and decouple the VNF 108 from an underlying physical network layer.

Each virtualized network function (VNF) 108 is run in one or more virtual containers, and corresponds to a group of network functions belonging to one or more physical devices.

An equipment management system (EM) 110 is a system used to configure and manage a device in a conventional telecommunications system, mainly used to configure, monitor, and manage a device. In the NFV architecture, the EM 110 may be also used to configure, monitor, and manage an instance of a VNF. In addition, an Operation Support System and Business Support System (OSS/BSS) 124 may further initiate, to the VNFM using the EM 110, a new lifecycle management operation such as instantiation of a VNF or VNF scaling.

The operation support system and business support system (OSS/BSS) 124 supports various end-to-end telecommunications services. A management function supported by the OSS includes network configuration, service provision, fault management, or the like. The BSS processes an order, payment, income, or the like, and supports product management, order management, profit management, and customer management.

In the architecture of the NFV system, the NFVO 102 is a resource management entity. The resource management entity is responsible for instantiating an NS. When a service requester (for example, the OSS/BSS 124 in FIG. 1) needs to deploy an NS, the service requester may send a descriptor of the NS (NSD) to the NFVO 102. The NFVO 102 stores the NSD. Subsequently, the OSS/BSS 124 may request the NFVO 102 to instantiate the NS based on the NSD. In an NS instantiation process, the NFVO 102 determines, based on a VNFD indicated in the NSD, a VNF to be instantiated, and then initiates, to the VNFM, a procedure of instantiating the VNF. Because the procedure of instantiating the VNF is triggered by the NFVO 102 in the NS instantiation process, the instantiated VNF is a VNF in the NS.

In addition to being initiated by the NFVO 102 in the NS instantiation process, instantiation of the VNF may also be initiated by another device outside the NS instantiation process. For example, the service requester (for example, the OSS/BSS 124 in FIG. 1) may initiate, to the VNFM using the EM 110 shown in FIG. 1, instantiation of the VNF. Because the instantiation of the VNF that is initiated by the EM 110 is not initiated in the process of instantiating the NS, these VNFs do not exist in any NS during instantiation.

The VNFM is an entity responsible for instantiating the VNF. The VNFM may receive a VNF instantiation request from the NFVO 102 or the EM 110. After receiving the VNF instantiation request, the VNFM requests resource authorization from the resource management entity (for example, the NFVO 102 in FIG. 1) responsible for virtual resource allocation and scheduling. The resource authorization mainly means that the NFVO 102 determines whether a virtual resource (for example, a virtual CPU, a virtual storage, or a virtual network) required by the VNF can be allocated, and if the virtual resource can be allocated, the NFVO 102 performs authorization, or if the virtual resource cannot be allocated, the NFVO 102 rejects performing authorization. After obtaining the authorization, the VNFM applies for the virtual resource from the VIM, and after obtaining the virtual resource through the applying, the VNFM configures the instance of the VNF to complete the instantiation of the VNF.

In this embodiment of the present disclosure, a device that instantiates the NS is referred to as a first device, and a device that instantiates the VNF is referred to as a second device. The first device and the second device may be a same device, or may be different devices. When VNF instantiation and NS instantiation are performed by a same device (for example, the NFVO 102), the device may associate an instantiated instance of the VNF with an instance of the NS, to provide a service externally. When VNF instantiation and NS instantiation are performed by different devices (for example, NS instantiation is performed by the NFVO 102, and VNF instantiation is performed by the EM 110), an instantiated instance of the VNF cannot be associated with an instance of the NS, and no service can be provided externally. Therefore, to avoid creation of a meaningless instance of the VNF, for a case in which the first device and the second device are different devices, this embodiment of the present disclosure provides a solution of managing VNF instantiation. This solution relates to an NS instantiation phase and a VNF instantiation phase.

In the NS instantiation phase, the requester device carries, in a request that is for instantiating the NS and that is sent to the first device, instance information of a VNF that is in the NS and that is to be instantiated using the second device. The first device records an instance identifier of the VNF that is in the NS and that is to be instantiated using the second device.

In the VNF instantiation phase, because the resource authorization is to be obtained from the resource management entity (namely, the first device), in this embodiment of the present disclosure, determining of an association relationship between the VNF and the NS is added in the authorization process. In other words, when the first device determines resource authorization, the first device further authorizes, based on the instance identifier that is of the VNF and that is recorded in the NS instantiation process, instantiation of the VNF, which is initiated by the second device. If a VNF, that the second device requests to instantiate, doesn't exist in the record, the first device rejects the second device to instantiate the VNF that the second device requests to instantiate.

In the NS instantiation phase, the requester device carries, in the request for instantiating the NS, the instance ID of the VNF to be instantiated by the second device, to record, in the first device, the VNF that is in the NS and that is to be instantiated by the second device. In this way, when the VNF is instantiated by the second device, the first device may control, based on the record, instantiation of the VNF. The instantiation the VNF is allowed when the VNF is recorded. This prevents the second device from instantiating some VNFs that cannot provide a service, thereby avoiding a waste of resources.

Figure 2:
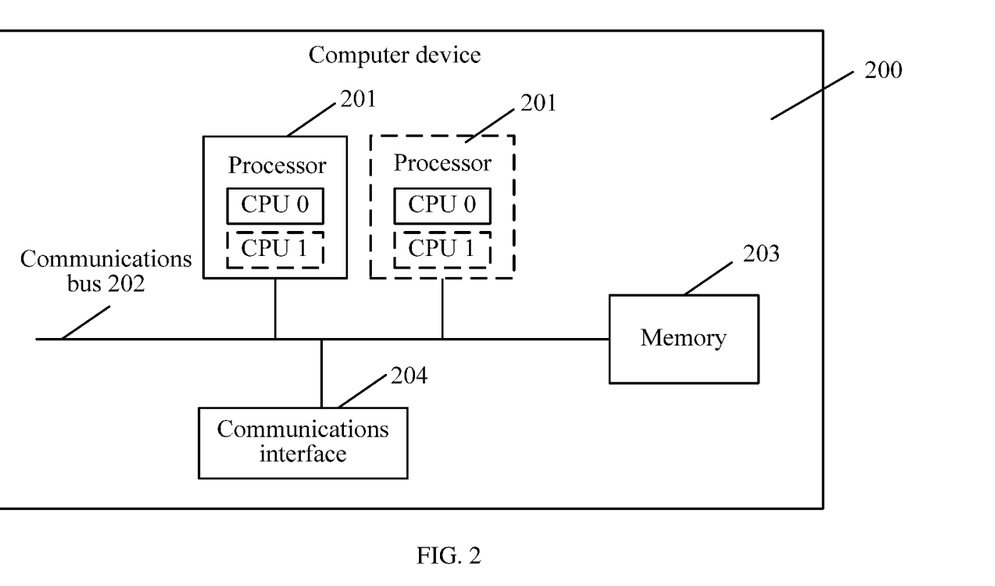
FIG. 2 is a schematic diagram of a computer device according to an embodiment of the present disclosure.

Each device in the NFV system 100 shown in FIG. 1 may be implemented using a computer device 200 in FIG. 2. For example, the computer device 200 may be configured to implement the NFVO 102, the VNFM 104, the VIM 106, the OSS/BSS 124, or the EM 110 in the NFV system 100 shown in FIG. 1. As shown in FIG. 2, the computer device 200 includes at least one processor 201, a communications bus 202, a memory 203, and at least one communications interface 204.

The processor 201 may be a general-purpose central processing unit (CPU), a microprocessor, an application-specific integrated circuit (ASIC), or one or more integrated circuits that are configured to control execution of a program in a solution of the present disclosure.

The communications bus 202 may include a path for transmitting information between the foregoing components. The communications interface 204 is applicable to any type of apparatus such as a transceiver, and configured to communicate with another device or a communications network, such as an Ethernet, a radio access network (RAN), a wireless local area network (WLAN). In this embodiment of the present disclosure, the communications interface 204 may be configured to communicate with an application server and another storage node in a distributed storage system.

The memory 203 may be a read-only memory (ROM), another type of static storage device that can store static information and an instruction, a random access memory (RAM), or another type of dynamic storage device that can store information and an instruction, or may be an electrically erasable programmable read-only memory (EEPROM), a read-only optical disc (e.g., a Compact Disc (CD) Read-Only Memory (CD-ROM)) or another optical disc storage, a disc storage (including a compact disc, a laser disc, an optical disc, a digital versatile disc, a Blu-ray disc, or the like), a magnetic disk storage medium or another magnetic disk storage device, or any other medium that can be used to carry or store expected program code in an instruction or data structure form and that can be accessed by a computer, but the present disclosure is not limited thereto. The memory may exist independently and is connected to the processor using the bus. Alternatively, the memory may be integrated with the processor.

The memory 203 is configured to store application program code for performing a solution of the present disclosure, and the processor 201 controls the performing. The processor 201 is configured to execute the application program code stored in the memory 203. For example, when the computer device 200 is configured to implement the NFVO 102 in the NFV system 100, the memory 203 stores code for implementing the function of the NFVO 102. The processor 201 executes the application program code stored in the memory 203, to perform the function of the first device (namely, the NFVO 102) in the embodiments shown in FIG. 3 and FIG. 4. When the computer device 200 is configured to implement the OSS/BSS 124 in the NFV system 100, the memory 203 stores code for implementing the function of the OSS/BSS 124. The processor 201 executes the application program code stored in the memory 203, to perform the function of the requester device (namely, the OSS/BSS 124) in the embodiments shown in FIG. 3 and FIG. 4.

During implementation, in an embodiment, the processor 201 may include one or more CPUs, for example, a CPU 0 and a CPU 1 in FIG. 2.

During implementation, in an embodiment, the computer device 200 may include a plurality of processors, for example, two processors 201 shown in FIG. 2. Each of these processors may be a single-core (single-CPU) processor, or may be a multi-core (multi-CPU) processor. The processors herein may refer to one or more devices, circuits, and/or processing cores configured to process data (for example, a computer program instruction).

The computer device 200 may be a general-purpose computer device or a dedicated computer device. During implementation, the computer device 200 may be a network server, a communications device, an embedded device, or a device having a structure similar to that in FIG. 2. A type of the computer device 200 is not limited in this embodiment of the present disclosure.

It should be noted that, the devices in the NFV system 100 shown in FIG. 1 may be separately implemented on different computer devices, or may be partially integrated into one computer device for implementation.

Figure 3:
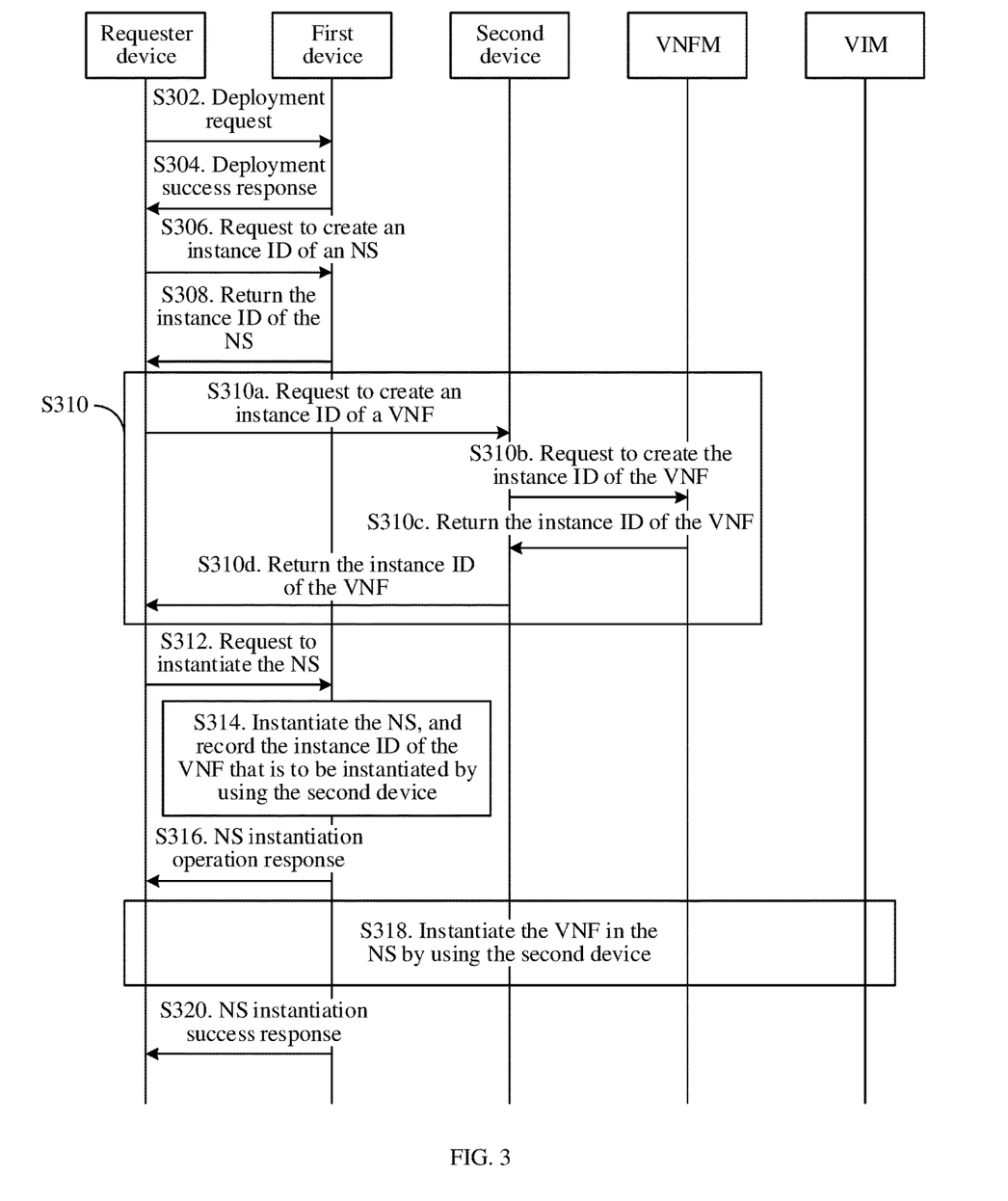
FIG. 3 is a flowchart of an NS instantiation method according to an embodiment of the present disclosure.
Figure 4:
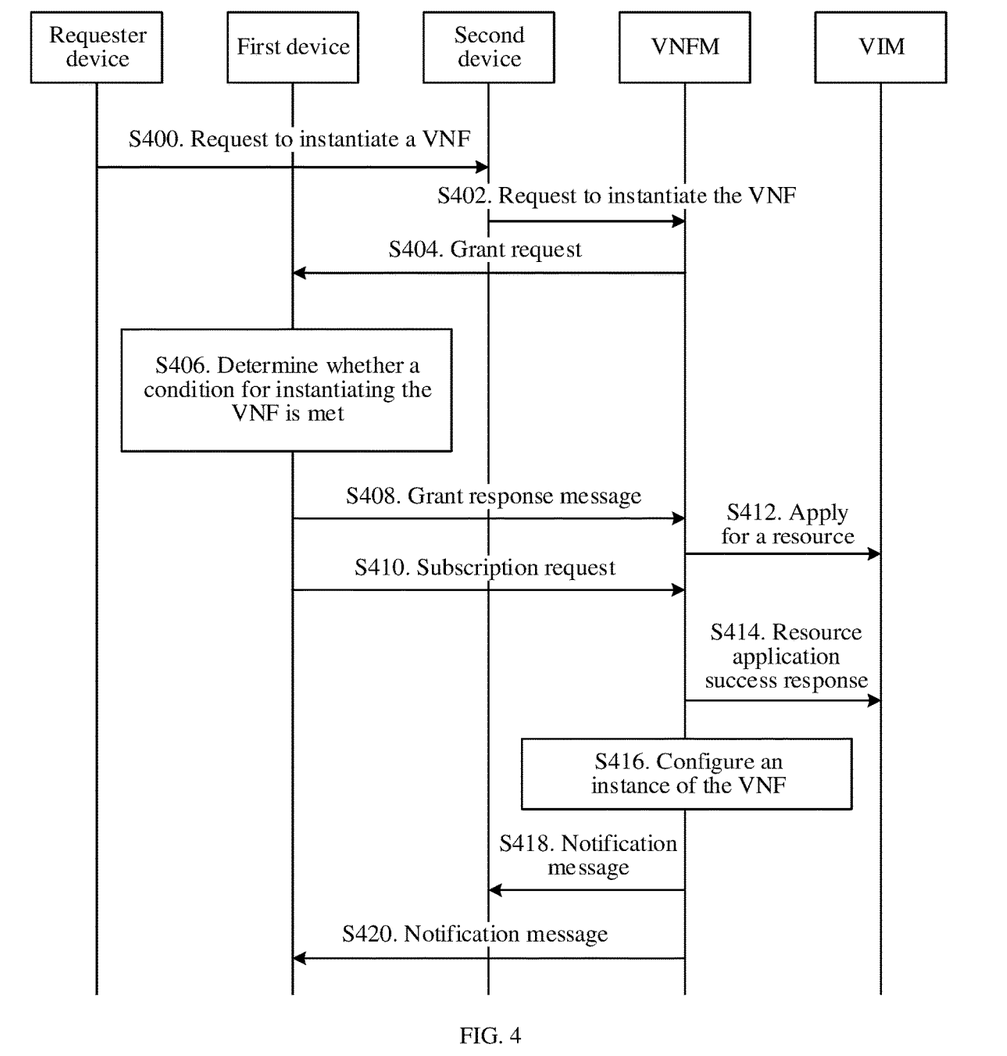
FIG. 4 is a flowchart of a VNF instantiation method according to an embodiment of the present disclosure.

The following describes in detail the NS instantiation process and the VNF instantiation process in the embodiments of the present disclosure using FIG. 3 and FIG. 4 respectively. FIG. 3 is a flowchart of an NS instantiation method according to an embodiment of the present disclosure. As shown in FIG. 3, the method includes the following steps.

S302. A requester device sends a deployment request to a first device.

The requester device may be the OSS/BSS in the NFV system shown in FIG. 1, and the first device may be the NFVO in the NFV system shown in FIG. 1.

The deployment request may include a deployment template of an NS (namely, an NSD) to be deployed. The NSD includes an identifier (ID) of the NSD. The deployment request may be an "NSD on-boarding" request defined in a European Telecommunications Standards Institute (ETSI) standard.

S304. After receiving the deployment request, the first device stores the NSD in the deployment request, and returns a deployment success response to the requester device.

S306. After receiving the deployment success response, the requester device sends, to the first device, a request for creating an instance ID of the NS.

The request for creating the instance ID of the NS includes an ID of the NSD stored in step S304.

S308. The first device creates the instance ID of the NS, and sends the instance ID of the NS to the requester device.

S310. The requester device obtains an instance identifier (ID) of a VNF.

Before sending a request for instantiating the NS, the requester device may determine, based on an NS deployment policy, whether there is a VNF to be instantiated using the second device in the NS. For example, the policy may be that all VNFs in the NS are to be instantiated using the second device, or may be that some VNFs are to be instantiated using the second device. For the VNF to be instantiated using the second device, the requester device may initiate a procedure for obtaining the instance ID of the VNF.

The foregoing policy may be included in a descriptor of the VNF indicated in the deployment template of the NS. For example, the descriptor of the VNF may include an indication parameter, and the indication parameter is used to indicate whether the VNF is to be instantiated using the second device. The requester device may determine, based on the indication parameter, the VNF to be instantiated by the second device. The indication parameter may be in a form shown in Table 1.

TABLE 1

| Parameter | Nature | Quantity | Content | Description |
| --- | --- | --- | --- | --- |
| EMenabled | M | 1 | Boolean | In case of true, the VNF is to be instantiated using an EM. In case of false, the VNF may not be instantiated using an EM. |

It should be noted that, that the policy is included in the descriptor of the VNF in a form of an indication parameter is merely one implementation. The policy may alternatively exist independently, or may be set in another manner.

The procedure in which the requester device obtains the instance ID of the VNF may include the following steps.

S310a. The requester device sends, to a second device, a request for creating the instance identifier (ID) of the VNF.

The second device may be the EM in the NFV system shown in FIG. 1. After determining that the NS to be instantiated includes a VNF which is to be instantiated by the second device, the requester device sends, to the second device, the request for creating the instance ID of the VNF.

S310b. After receiving the request for creating the instance ID of the VNF, the second device sends, to a VNFM, the request for creating the instance ID of the VNF.

The request that is for creating the instance ID of the VNF and that is sent by the second device to the VNFM may carry an ID of the VNF to be instantiated.

S310c. The VNFM allocates the instance ID of the VNF, and returns the instance ID of the VNF to the second device.

S310d. The second device returns the received instance ID of the VNF to the requester device.

It should be noted that, if a plurality of VNFs in the NS are to be instantiated using the second device, after the requester device receives the instance ID of the VNF that is returned by the second device, step S310a to S310d may be repeatedly performed, until instance IDs of all the VNFs that are to be instantiated using the second device in the NS are created.

It should be noted that, the manner of obtaining the instance ID of the VNF shown in step S310a to S310d is merely one embodiment. During implementation, a step may be deleted, or the instance ID of the VNF may be obtained in another manner. In addition, step S310 only needs to be performed before S312, and there is no specific order of performing step S310 and step S302 to S308.

S312. The requester device sends, to the first device, a request for instantiating the NS.

After obtaining the instance identifier of the VNF that is to be instantiated using the EM in the NS in step S310, the requester device sends, to the first device, the request for instantiating the NS.

When sending the request for instantiating the NS, the requester device carries, in the request for instantiating the NS, instance information of the virtualized network function VNF that is to be instantiated using the second device in the NS. The instance information may include the instance ID of the VNF and status information indicating that the VNF is to be instantiated by the second device.

In addition to the VNF that is to be instantiated using the EM, the NS may further include a VNF that is to be instantiated by the first device and/or an existing instance of a VNF. When the NS further includes a VNF is to be instantiated by the first device, the first device may instantiate the VNF based on a VNFD indicated in the NSD. When the NS further includes an existing instance of a VNF, the request that is for instantiating the NS and that is sent by the requester device may include an instance ID of the existing instance of the VNF and status information indicating that the VNF is already instantiated. Content that may be carried in the request is shown in Table 2.

TABLE 2

| Parameter | Nature | Quantity | Content | Description |
| --- | --- | --- | --- | --- |
| vnfInstanceId | M | 1 | Identifier | Instance ID of a VNF |
| Status | M | 0 . . . 1 | Enum | Possible values of the status information corresponding to the instance of the VNF are: Instantiated (already instantiated), or Created by EM, and non-instantiated (to be more specific, to be created by the EM, and not yet instantiated). |

"Status" is the status information of the instance of the VNF corresponding to the instance ID of the VNF. When a value of the field is "Instantiated", it indicates that the VNF is already instantiated and may be directly used. When the value of the field is "Created by EM, and non-instantiated", it indicates that the instance of the VNF is not instantiated and is to be created by the EM. The forms of "vnfInstanceId" and "Status" defined in Table 1 are merely one example of the instance identifier and the status information of the instance of the VNF.

It should be noted that, only improvement of the request for instantiating the NS in this embodiment of the present disclosure is described above. During implementation, the request for instantiating the NS may further include other information, for example, the instance ID of the NS, an ID of the NSD, or an ID of the VNFD. For other information included in the request for instantiating the NS, refer to information in a request for instantiating an NS "InstantiateNSRequest" defined in the ETSI standard.

S314. The first device determines the VNF that is in the NS and that is to be instantiated by the second device, and records an instance ID of the VNF that is to be instantiated using the second device.

After receiving the request for instantiating the NS, the first device instantiates the NS (in other words, creates an instance of the NS). In an NS instantiation process, the first device may check the instance information of the VNF in the request, and determine, based on status information in instance information of each VNF, a VNF in the NS that is to be instantiated by the second device. For the VNF that is to be instantiated using the second device, the first device records an instance ID of the VNF, to indicate that the VNF is associated with an NS, and when the second device sends a request for instantiating the VNF, the first device performs authorization based on the record. When the instance identifier of the VNF is recorded, instance information of the corresponding NS (for example, an instance identifier of the NS) may be further recorded, to specify the instance of the NS with which an instance of the VNF corresponding to the instance identifier of the VNF is specifically associated.

The first device may further determine, based on information about the VNFD indicated in the NSD, whether there is a VNF is to be instantiated using the first device. For the VNF that is to be instantiated using the first device, the first device initiates, to the VNFM, a procedure for instantiating the VNF. That the first device initiates, to the VNFM, a procedure for instantiating the VNF may be implemented using other approaches. For an implementation process, refer to an operation that is defined in the ETSI standard and in which an NFVO initiates a procedure for instantiating a VNF. Details are not described herein again.

S316. The first device returns an NS instantiation operation response to the requester device.

The NS instantiation operation response carries an operation ID of a current NS instantiation operation. After returning the NS instantiation operation response, the first device waits for the second device to instantiate the VNF.

It should be noted that, there is no specific order of performing step S314 and S316. The first device may directly return the NS instantiation operation response after receiving the request for instantiating the NS, or may return the NS instantiation operation response after instantiating the NS.

S318. After receiving the NS instantiation operation response returned by the first device, the requester device initiates, using the second device, a procedure for instantiating the VNF, and completes instantiation of the VNF.

After receiving the NS instantiation operation response, the requester device sends, based on the instance ID of the VNF that is obtained in step S310, a request for instantiating the VNF. In a process in which the second device instantiates the VNF, the first device may control, based on the association (namely, the instance ID that is of the VNF and that is recorded in the NS instantiation process) established in step S314, instantiation of the VNF by the second device. For example, the first device determines whether the instance ID of the VNF that the second device requests to instantiate exists in the instance ID that is of VNF and that is recorded in the NS instantiation process, to determine whether to authorize the second device to instantiate the VNF that the second device requests to instantiate.

The procedure that is for instantiating the VNF and that is initiated by the second device is described in detail in FIG. 3.

S320. After all VNFs in the NS are instantiated, the first device sends an NS instantiation success message to the requester device.

The first device sends the NS instantiation success message to the requester device after determining that the VNF that is in the NS and that is to be instantiated by the first device and the VNF that is to be instantiated by the second device and that is recorded in S314 are instantiated.

In this embodiment of the present disclosure, the instance ID of the VNF to be instantiated by the second device is created before the request for instantiating the NS is sent, such that the requester device can carry the instance ID of the VNF to be instantiated by the second device in the request for instantiating the NS and send the request to the first device, to enable the first device to obtain a relationship between the NS to be instantiated and the VNF to be instantiated by the second device.

The following describes, in detail using FIG. 4, the process of implementing VNF instantiation in step S318. FIG. 4 is a flowchart of a VNF instantiation method according to an embodiment of the present disclosure. As shown in FIG. 4, the method includes the following steps.

S400. The requester device sends, to the second device, a request for instantiating a VNF.

After receiving the operation response returned by the first device in step S316, the requester device sends, to the second device, the request for instantiating the VNF. The request for instantiating the VNF carries the instance ID of the VNF that is obtained in the NS instantiation process (namely, step S310 in FIG. 3).

S402. The second device sends, to a VNFM, the request for instantiating the VNF.

After receiving the request sent by the requester device for instantiating the VNF, the second device forwards the request for instantiating the VNF to the VNFM.

S404. The VNFM sends, to the first device, a grant request for instantiating the VNF.

The grant request is used to request the first device to authorize the VNFM to perform an operation of instantiating the VNF. The grant request carries the instance ID of the VNF to be instantiated and information about a resource for which the instantiation operation needs to apply.

S406. The first device determines whether a condition for instantiating the VNF is met.

The condition for instantiating the VNF includes that the instance ID of the VNF that is carried in the grant request exists in an instance identifier that is of VNF and that is recorded during instantiation of the NS. After receiving the grant request, the first device compares the instance ID of the VNF that is carried in the grant request with the instance ID of the VNF that is recorded in the NS instantiation process (namely, step S314 in FIG. 3). If the instance ID of the VNF that is carried in the grant request exists in the instance ID that is of the VNF and that is recorded in S314, the first device determines that the VNF to be instantiated in the grant request is used to instantiate the NS in step S314 and the condition for instantiating the VNF is met. If the instance ID of the VNF that is carried in the grant request does not exist in the instance ID that is of the VNF and that is recorded in S314, the condition for instantiating the VNF is not met.

Only a newly added condition for instantiating the VNF in the VNF instantiation process in this embodiment of the present disclosure is described above. During implementation, the condition for instantiating the VNF may further include some conditions defined in other approaches, for example, determining of a status of an applied virtual resource. For the condition that is for instantiating the VNF and that is defined in other approaches, refer to the ETSI standard.

S408. After determining that the condition for instantiating the VNF is met, the first device authorizes the VNFM to perform the operation of instantiating the VNF.

The first device may return a grant success response message to the VNFM, to authorize the VNFM to perform the operation of instantiating the VNF. The grant success response message may carry information about a VIM.

When there are a plurality of conditions for instantiating the VNF, the first device authorizes, after determining that all the conditions are met, the VNFM to perform the operation of instantiating the VNF. When any condition is not met, the first device rejects the VNFM for performing the operation of instantiating the VNF. A process in which the condition for instantiating the VNF is not met is not shown in FIG. 4.

S410. The first device sends, to the VNFM, a subscription request for subscribing to an instance of the VNF.

After determining that the condition for instantiating the VNF is met, the first device further sends the subscription request to the VNFM. The subscription request is used to request the VNFM to send a notification message to the first device after the VNFM instantiates the VNF.

S412. After receiving the grant success response message returned by the first device, the VNFM sends a resource application request to the VIM.

The VNFM determines, based on the information about the VIM that is carried in the grant success response message, the VIM that receives the resource application request.

S414. The VIM returns a resource application success response to the VNFM.

After receiving the resource application request, the VIM applies for a virtual resource required by the instance of the VNF, and carries an address of the instance of the VNF in the resource application success response.

S416. The VNFM configures the instance of the VNF, and completes creation of the instance of the VNF.

For example, the VNFM may configure external link address information, a scaling policy, or the like of the instance of the VNF. After the configuration is completed, the instance of the VNF is created.

S418. The VNFM sends a notification message to the second device, to notify the second device that the VNF is instantiated.

S420. The VNFM sends a notification message to the first device, to notify the first device that the VNF is instantiated.

In a process in which the second device instantiates the VNF, the first device may determine, based on the instance identifier that is of the VNF and that is recorded during instantiation of the NS, whether to allow the second device to instantiate the VNF, to control instantiation of the VNF by the second device, thereby ensuring that the second device creates a valid VNF and avoiding a waste of resources.

Figure 5:
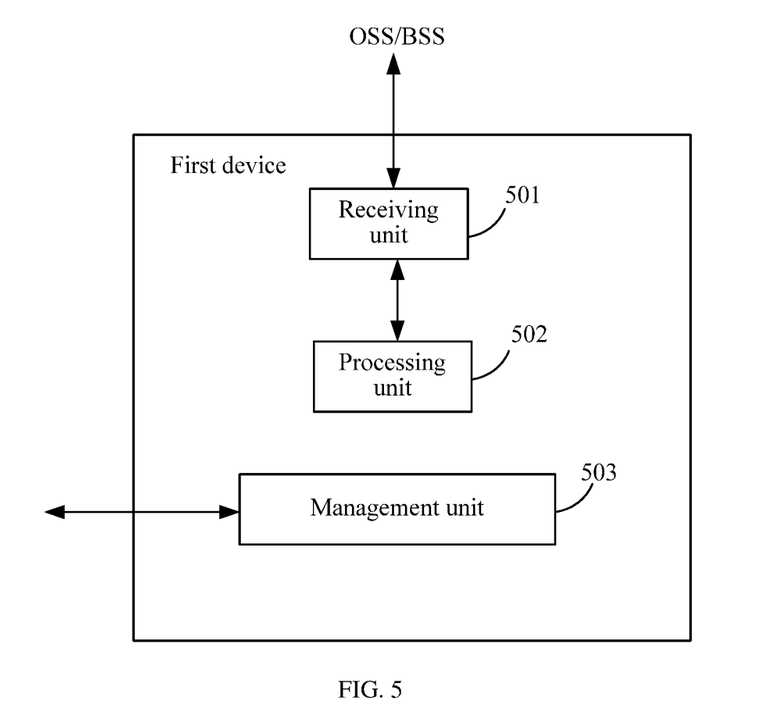
FIG. 5 is a structural diagram of a first device according to an embodiment of the present disclosure.

FIG. 5 is a possible schematic structural diagram of the first device in the foregoing embodiments. As shown in FIG. 5, the first device includes a receiving unit 501, a processing unit 502, and a management unit 503.

The receiving unit 501 may interact with a requester device. For example, the receiving unit 501 may receive a request that is for instantiating an NS and that is sent by the requester device. In addition, interaction between the first device and the requester device in the method embodiment shown in FIG. 3 may be implemented using the receiving unit 501. For an implementation process, refer to the part of the method embodiment shown in FIG. 3. Details are not described herein again.

The processing unit 502 is configured to instantiate the NS. For example, the processing unit 502 may determine, in the request for instantiating the NS that is received by the receiving unit 501, a VNF that is to be instantiated using a second device, and record an instance identifier of the VNF that is to be instantiated using the second device. In the method embodiment shown in FIG. 3, the function of storing the NSD in step S304, the function of creating the instance ID of the NS in S308, and the function of instantiating the NS in step S314 all can be implemented by the processing unit 502. For an implementation process, refer to the part of the method embodiment shown in FIG. 3. Details are not described herein again.

The management unit 503 may interact with a VNFM, and authorize, during instantiation of the VNF, instantiation of the VNF based on the instance identifier that is of the VNF and that is recorded by the processing unit 502 during instantiation of the NS. For example, the management unit 503 may receive a grant request sent by the VNFM after the VNFM receives a request sent by the second device for instantiating the VNF. After receiving the grant request, the management unit 503 determines whether a condition for instantiating the VNF is met. The determining whether a condition for instantiating the VNF is met includes: determining whether the instance identifier that is of the VNF and that is carried in the grant request exists in the instance identifier that is of VNF and that is recorded during instantiation of the NS. After determining that the condition for instantiating the VNF is met, the management unit 503 authorizes the VNFM to perform an operation of instantiating the VNF. In addition, interaction between the first device and the VNFM in the method embodiments shown in FIG. 3 and FIG. 4 may be implemented using the management unit 503. For an implementation process, refer to the part of the method embodiments shown in FIG. 3 and FIG. 4. Details are not described herein again.

Figure 6:
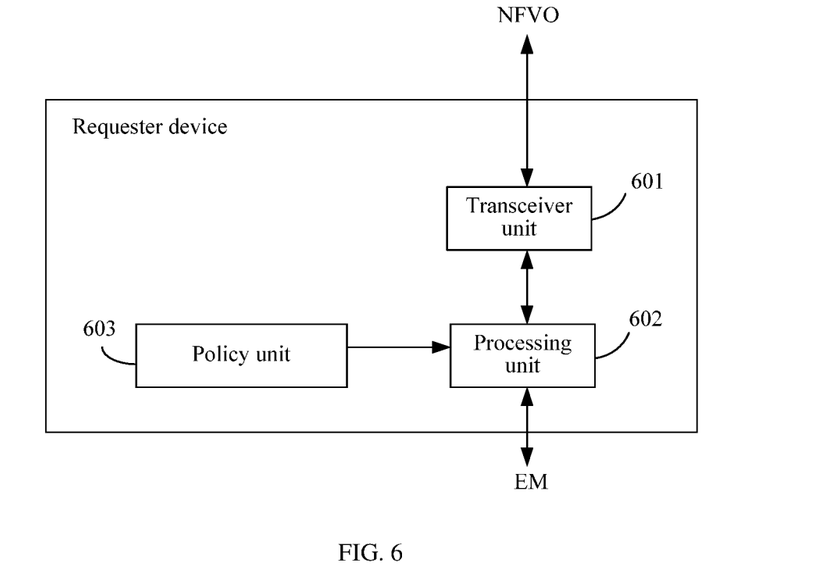
FIG. 6 is a structural diagram of a requester device according to an embodiment of the present disclosure.

FIG. 6 is a possible schematic structural diagram of the requester device in the foregoing embodiments. As shown in FIG. 6, the requester device includes a transceiver unit 601 and a processing unit 602.

The transceiver unit 601 may interact with a first device. For example, the transceiver unit 601 may send, to the first device, a request for instantiating an NS, and receive an NS instantiation operation response returned by the first device. In addition, interaction between the requester device and the first device in the method embodiment shown in FIG. 3 may be implemented using the transceiver unit 601. For an implementation process, refer to the part of the method embodiment shown in FIG. 3. Details are not described herein again.

The processing unit 602 may interact with a second device. For example, the processing unit 602 may request, using the second device, a VNFM to create an instance identifier of a VNF that is in the NS and that is to be instantiated using the second device, and may further request, using the second device, the VNFM to instantiate the VNF. In addition, interaction between the requester device and the second device in the method embodiments shown in FIG. 3 and FIG. 4 may be implemented using the processing unit 602. For an implementation process, refer to the part of the method embodiments shown in FIG. 3 and FIG. 4. Details are not described herein again.

During implementation, the requester device may further include a policy unit 603. The policy unit 603 is configured to: query for a descriptor of a VNF indicated in a deployment template of the NS; determine, based on an indication parameter in the descriptor of the VNF, the VNF that is to be instantiated by the second device; and trigger, based on a determining result, the processing unit 602 to perform the operation of requesting, through the second device, the VNFM to create the instance identifier of the VNF that is in the NS and that is to be instantiated using the second device. For an implementation of the policy unit 603, refer to step S310 in the method embodiment shown in FIG. 3. Details are not described herein again.

In the several embodiments provided in this application, it should be understood that the disclosed system and method may be implemented in other manners. For example, the described apparatus embodiment is merely an example. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The modules described as separate parts may or may not be physically separate, and parts displayed as modules may or may not be physical units, may be located in one position, or may be distributed on a plurality of network units. Some or all of the units may be selected based on actual requirements to achieve the objectives of the solutions of the embodiments.

In addition, function modules in the embodiments of the present disclosure may be integrated into one processing unit, or each of the modules may exist alone physically, or two or more modules may be integrated into one module. The integrated module may be implemented in a form of hardware, or may be implemented in a form of hardware plus a software function unit.

When the foregoing integrated unit is implemented in a form of a software function unit, the integrated unit may be stored in a computer-readable storage medium. The software function unit is stored in a storage medium and includes several instructions for instructing a computer device (which may be a personal computer, a server, a network device, or the like) to perform some of the steps of the methods described in the embodiments of the present disclosure. The foregoing storage medium includes: any medium that can store data, such as a USB flash drive, a removable hard disk, a random access memory (RAM), a magnetic disk, or an optical disc.

An embodiment of the present disclosure further provides another computer storage medium, configured to store a computer software instruction used by the foregoing storage node, and the computer software instruction includes a program designed for performing the method embodiment shown in FIG. 3.

An embodiment of the present disclosure further provides another computer storage medium, configured to store a computer software instruction used by the foregoing distributed storage system, and the computer software instruction includes a program designed for performing the method embodiment shown in FIG. 4.

A person skilled in the art should understand that the embodiments of the present disclosure may be provided as a method, an apparatus (a device), or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a magnetic disk memory, a CD-ROM, an optical memory, and the like) that include computer-usable program code. The computer program is stored/distributed in a proper medium and is provided as or used as a part of the hardware together with other hardware, or another distribution form may alternatively be used, such as using the Internet or another wired or wireless telecommunications system.

The present disclosure is described with reference to the flowcharts and/or block diagrams of the method, the apparatus (device), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, such that the instructions executed by a computer or a processor of any other programmable data processing device generate an apparatus for implementing a specified function in one or more processes in the flowcharts and/or in one or more blocks in the block diagrams.

These computer program instructions may also be stored in a computer-readable memory that can instruct the computer or any other programmable data processing device to work in a specific manner, such that the instructions stored in the computer-readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, such that a series of operations and steps are performed on the computer or the other programmable device, thereby generating computer-implemented processing. Therefore, the instructions executed on the computer or the other programmable device provide steps for implementing a specified function in one or more processes in the flowcharts and/or in one or more blocks in the block diagrams.

Although the present disclosure is described with reference to example features and the embodiments thereof, various modifications and combinations may be made to them without departing from the spirit and scope of the present disclosure. Correspondingly, the specification and accompanying drawings are merely example descriptions of the present disclosure defined by the accompanying claims, and are considered as any of or all modifications, variations, combinations or equivalents that cover the scope of the present disclosure. The present disclosure is intended to cover these modifications and variations provided that they fall within the scope of the claims of the present disclosure and their equivalent technologies.

What is claimed is:

1. A method for managing virtualized network function (VNF) instantiation, comprising:
   receiving, by a first device, a request from a requester device for instantiating a Network Service (NS), wherein the request carries instance information of a VNF that is in the NS and that is to be instantiated using a second device, wherein the instance information comprises an instance identifier of the VNF, and wherein the instance identifier is obtained by the requester device from a virtualized network function manager (VNFM) through the second device before the first device receives the request from the requester device;
   recording, by the first device, the instance identifier, and authorizing, by the first device during instantiation of the VNF, an instantiation of the VNF based on the instance identifier;
   wherein authorizing the instantiation of the VNF based on the instance identifier comprises:
      receiving, by the first device, a grant request from the VNFM, wherein the grant request carries the instance identifier;
      determining, by the first device, that a condition for instantiating the VNF is met, wherein the condition comprises that the instance identifier that is carried in the grant request exists in the instance identifier that is recorded during the instantiation of the NS; and
      authorizing, by the first device, the VNFM to perform an operation of instantiating the VNF.

2. The method according to claim 1, wherein after determining that the condition for instantiating the VNF is met, the method further comprises:
   sending, by the first device to the VNFM, a subscription request for subscribing to an instance of the VNF, wherein the subscription request requests the VNFM to send a notification message to the first device after the VNFM instantiates the VNF; and
   receiving, by the first device, the notification message from the VNFM after the VNF is successfully instantiated, wherein the notification message indicates that the VNF is instantiated.

3. The method according to claim 1, wherein the instance information further comprises status information indicating that the VNF is to be instantiated by the second device.

4. The method according to claim 3, further comprising determining, by the first device based on the status information, the VNF that is in the NS and that is to be instantiated using the second device.

5. The method according to claim 1, wherein before sending, by the requester device, the request for instantiating the NS, the method further comprises:
   requesting, by the requester device through the second device, a virtualized network function manager (VNFM) to create the instance identifier using the second device; and
   receiving, by the requester device, the instance identifier of the VNF that is created by the VNFM.

6. The method according to claim 5, further comprising querying, by the requester device, for a descriptor of a VNF.

7. The method according to claim 6, wherein the descriptor of the VNF comprises an indication parameter, and wherein the indication parameter indicates whether the VNF is to be instantiated using the second device.

8. The method according to claim 7, further comprising:
   determining, by the requester device based on the indication parameter, the VNF that is to be instantiated using the second device; and
   requesting, by the requester device based on the determination, the VNFM to create the instance identifier of the VNF that is in the NS and that is to be instantiated using the second device.

9. An apparatus for managing virtualized network function (VNF) instantiation, wherein the apparatus functions as a requester device, and wherein the apparatus comprises:
- a memory configured to store an instruction; and
- a processor configured to execute the instruction in the memory such that when executed, the processor is configured to:
  - send, to a first device, a request for instantiating a Network Service (NS), wherein the request comprises an instance identifier of a VNF that is in the NS and that is to be instantiated using a second device, wherein the instance identifier is obtained by the requester device from a virtualized network function manager (VNFM) through the second device before the first device receives the request from the requester device, and wherein the instance identifier of the VNF is to be recorded by the first device;
  - receive an NS instantiation operation response from the first device; and
  - request, through the second device, the VNFM to instantiate the VNF, wherein during instantiation of the VNF, the instance identifier is to be used to authorize the instantiation of the VNF;
- wherein the processor being configured to authorize the instantiation of the VNF is such that the processor is configured to:
  - receive a grant request from the VNFM, wherein the grant request carries the instance identifier;
  - determine that a condition for instantiating the VNF is met, wherein the condition comprises that the instance identifier exists in the instance identifier that is recorded during the instantiation of the NS; and
  - authorize the VNFM to perform an operation of instantiating the VNF.

10. The apparatus according to claim 9, wherein the request further comprises status information indicating that the VNF is to be instantiated by the second device.

11. The apparatus according to claim 9, wherein when the instruction is executed, the processor is further configured to:
- request, before the request for instantiating the NS, the VNFM to create the instance identifier; and
- receive the instance identifier of the VNF created by the VNFM.

12. The apparatus according to claim 11, wherein when the instruction is executed, the processor is further configured to query for a descriptor of the VNF, wherein the descriptor comprises an indication parameter, and wherein the indication parameter indicates whether the VNF is to be instantiated using the second device.

13. The apparatus according to claim 12, wherein when the instruction is executed, the processor is further configured to:
- determine, based on the indication parameter, the VNF that is to be instantiated using the second device; and
- request, based on the determination, the VNFM to create the instance identifier of the VNF.

14. An apparatus for managing virtualized network function (VNF) instantiation, wherein the apparatus functions as a first device, and wherein the apparatus comprises:
- a memory configured to store an instruction; and
- a processor configured to execute the instruction in the memory such that when executed, the processor is configured to:
  - receive a request, from a requester device for instantiating a Network Service (NS), wherein the request carries instance information of a VNF that is in the NS and that is to be instantiated using a second device, wherein the instance information comprises an instance identifier of the VNF, and wherein the instance identifier of the VNF is obtained by the requester device from a virtualized network function manager (VNFM), before the first device receives the request from the requester device;
  - record the instance identifier of the VNF; and
  - authorize, during instantiation of the VNF, an instantiation of the VNF based on the instance identifier;
- wherein the processor being configured to authorize the instantiation of the VNF is such that the processor is configured to:
  - receive a grant request from the VNFM, wherein the grant request carries the instance identifier;
  - determine that a condition for instantiating the VNF is met, wherein the condition comprises that the instance identifier exists in the instance identifier that is recorded during the instantiation of the NS; and
  - authorize the VNFM to perform an operation of instantiating the VNF.

15. The apparatus according to claim 14, wherein when the instruction is executed, the processor is further configured to:
- send the VNFM a subscription request for subscribing to an instance of the VNF after determining that the condition for instantiating the VNF is met, wherein the subscription request requests the VNFM to send a notification message to the first device after the VNFM instantiates the VNF; and
- receive the notification message from the VNFM after the VNF is successfully instantiated, wherein the notification message indicates that the VNF is instantiated.

16. The apparatus according to claim 14, wherein the instance information further comprises status information indicating that the VNF is to be instantiated by the second device, and wherein when the instruction is executed, the processor is further configured to: determine, based on the status information, the VNF that is in the NS and that is to be instantiated using the second device.

* * * * *